United States Patent
Proksa et al.

(10) Patent No.: US 9,230,348 B2
(45) Date of Patent: Jan. 5, 2016

(54) IMAGING SYSTEM FOR IMAGING A REGION OF INTEREST

(75) Inventors: Roland Proksa, Neu Wulmstorf (DE); Bernhard Johannes Brendel, Norderstedt (DE); Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 217 days.

(21) Appl. No.: 13/994,775

(22) PCT Filed: Dec. 15, 2011

(86) PCT No.: PCT/IB2011/055689
§ 371 (c)(1),
(2), (4) Date: Jun. 17, 2013

(87) PCT Pub. No.: WO2012/080971
PCT Pub. Date: Jun. 21, 2012

(65) Prior Publication Data
US 2013/0279785 A1    Oct. 24, 2013

(30) Foreign Application Priority Data

Dec. 17, 2010   (EP) .................................... 10195738

(51) Int. Cl.
G06T 11/00 (2006.01)
(52) U.S. Cl.
CPC ............. *G06T 11/003* (2013.01); *G06T 11/006* (2013.01); *G06T 2211/408* (2013.01); *G06T 2211/424* (2013.01)
(58) Field of Classification Search
CPC .................................................. G06T 11/003
See application file for complete search history.

(56) References Cited

U.S. PATENT DOCUMENTS

| | | | |
|---|---|---|---|
| 6,507,633 B1 * | 1/2003 | Elbakri et al. ..................... | 378/8 |
| 6,775,352 B2 | 8/2004 | Toth et al. | |
| 6,845,142 B2 | 1/2005 | Ohishi | |
| 7,391,844 B2 | 6/2008 | Wu et al. | |
| 7,724,935 B2 | 5/2010 | Van Stevendaal et al. | |
| 7,747,057 B2 | 6/2010 | Wu et al. | |
| 7,889,834 B2 * | 2/2011 | Heismann ......................... | 378/4 |
| 8,005,288 B2 * | 8/2011 | Chen et al. ..................... | 382/132 |

(Continued)

OTHER PUBLICATIONS

Erdogan, H., et al.; Ordered subsets algorithms for transmission tomography; 1999; Phys. Med. Biol.; 44:2835-2851.

(Continued)

*Primary Examiner* — Uptal Shah

(57) ABSTRACT

The noise of a detection value acquired by an imaging system (30) can depend on the contributions of different components within a region of interest to be imaged, which has been traversed by radiation (4) causing the respective acquired detection value. This dependence is considered while iteratively reconstructing an image of the region of interest, wherein first component attenuation values, which correspond to elements of a first component within the region of interest, and second component attenuation values, which correspond to elements of a first component within the region of interest, are determined, wherein noise values are determined from the first component attenuation values and the second component attenuation values and wherein the noise values are used for updating the image. This consideration of the dependence of the noise of an acquired detection value on the different components improves the quality of the iteratively reconstructed image.

20 Claims, 2 Drawing Sheets

(56) References Cited

U.S. PATENT DOCUMENTS

2003/0156684 A1* 8/2003 Fessler .................. 378/210
2009/0262997 A1 10/2009 Zou et al.

OTHER PUBLICATIONS

Kelcz, F., et al.; Noise considerations in dual energy CT scanning; 1979; Med. Phys.; 6(5)418-425.

Llopart, X., et al.; First test measurements of a 64k pixel readout chip working in single photon counting mode; 2003; Nuclear Instruments and Methods in Physics Research; A 509:157-163.

Llopart, X., et al.; Medipix2: a 64-k Pixel Readout Chip with 55-um Square Elements Working in Single Photon Counting Mode; 2002; IEEE Trans. on Nuclear Science; 49(5)2279-2283.

Roessl, E., et al.; K-edge imaging in x-ray computed tomography using multi-bin photon counting detectors; 2007; Phys. Med. Biol.; 52:4679-4696.

* cited by examiner

IMAGING SYSTEM FOR IMAGING A REGION OF INTEREST

FIELD OF THE INVENTION

The invention relates to an imaging system, an imaging method and an imaging computer program for imaging a region of interest.

BACKGROUND OF THE INVENTION

The article "Ordered subsets algorithms for transmission tomography" by H. Erdogan and J. A. Fessler, Physics in Medicine and Biology, 44(11), November 1999 discloses an iterative reconstructing method for iteratively reconstructing an image from detection values acquired by using a computed tomography system. In an iteration step a forward projection through an actual image is performed for generating simulated detection values, a difference between the simulated detection values and the acquired detection values is determined, and updates are calculated from the difference using a noise model, which are then back projected for updating the actual image. Several of these iteration steps are performed, until a termination condition is fulfilled. Although the updates are calculated by using a noise model, the quality of the reconstructed image is still reduced.

SUMMARY OF THE INVENTION

It is an object of the present invention to provide an imaging system, an imaging method and an imaging computer program for imaging a region of interest, wherein the quality of an iteratively reconstructed image can be improved.

In a first aspect of the present invention an imaging system for imaging a region of interest is presented, wherein the imaging system comprises:
  a detection values providing unit for providing acquired detection values of the region of interest, wherein the region of interest comprises at least two components, wherein the detection values have been acquired by moving a radiation source emitting radiation and the region of interest relative to each other and by detecting the detection values, which are indicative of the radiation after having traversed the region of interest, while the radiation source and the region of interest move relative to each other,
  a reconstruction unit for iteratively reconstructing a final image of the region of interest by performing several iteration steps, in which an intermediate image is updated based on the acquired detection values and based on noise values being indicative of the noise of the detection values, wherein the reconstruction unit is adapted to:
  determine first component attenuation values and second component attenuation values, wherein the first component attenuation values correspond to elements of a first component within the region of interest and wherein the second component attenuation values correspond to elements of a second component within the region of interest,
  determine the noise values from the first component attenuation values and the second component attenuation values.

The noise of an acquired detection value can depend on the contributions of the different components, which have been traversed by the radiation causing the respective acquired detection value. This dependence can be considered while iteratively reconstructing the image of the region of interest, if first component attenuation values and second component attenuation values are determined, wherein the first component attenuation values correspond to elements of a first component within the region of interest and wherein the second component attenuation values correspond to elements of a second component within the region of interest, and if the noise values, which are used for updating the respective intermediate image, are determined from the first component attenuation values and the second component attenuation values. This consideration of the dependence of the noise of an acquired detection value on the different components, which have been traversed by the radiation causing the respective detection value, improves the quality of the iteratively reconstructed image.

The region of interest can comprise more than two components, and the reconstruction unit can be adapted to determine more than two kinds of component attenuation values, wherein in this case the noise values are determined from the more than two kinds of component attenuation values. The different components can be different base materials like bone and soft tissue, and/or they can relate to different physical effects like a photoelectric effect, a Compton effect, a K-edge effect, et cetera.

The radiation emitted by the radiation source is preferentially polychromatic radiation of which lower energies are attenuated stronger than larger energies by the components within the region of interest. This leads to a so-called beam hardening of the radiation, which limits the quality of the acquired detection values and, thus, of images iteratively reconstructed by using the acquired detection values. It is therefore preferred that the reconstruction unit is adapted to correct the acquired detection values for beam hardening based on the determined first component attenuation values and the determined second component attenuation values. This correction for beam hardening further improves the quality of the iteratively reconstructed image.

The determination of the noise values can be performed before the iterative reconstruction is started, or in one, several or all iteration steps during the iterative reconstruction. Also the beam hardening correction of the acquired detection values can be performed before the iterative reconstruction is started, or in one, several or all iteration steps during the iterative reconstruction.

The detection values providing unit can be a storing unit, in which acquired detection values are stored already, or it can be a detection values acquisition unit like an acquisition unit of an x-ray computed tomography system, an x-ray C-arm system, a nuclear imaging system, for example, a positron emission tomography system or a single photon emission computed tomography system, et cetera.

The reconstruction unit can be adapted for performing in an iteration step a forward projection through the intermediate image for generating simulated line integrals of absorption values, a subtraction of a line integral of absorption values determined from the respective acquired detection value and the simulated line integral of absorption values, a calculation of an update from the difference by using the noise value and a back projection of the update for updating the intermediate image, wherein several of these iteration steps are performed, until a termination condition is fulfilled, in particular, until deviations between the simulated line integrals of absorption values and the line integrals of absorption values determined from the acquired detection values or deviations between an actual intermediate image and a previous intermediate image are below a predefined threshold.

Preferentially, in each iteration step beam hardening corrected acquired projection data are used.

The noise values are preferentially variances of the acquired detection values. This allows considering the noise while updating the intermediate image very effectively.

It is preferred that the noise values are determined depending on the energy spectrum of the radiation emitted by the radiation source. The determination of the noise value depending on the energy spectrum of the radiation emitted by the radiation source improves the quality of the noise values and, thus, the consideration of the noise while iteratively reconstructing the image. This in turn further improves the quality of the iteratively reconstructed image.

It is further preferred that the reconstruction unit is adapted to determine for each acquired detection value a ratio between a corresponding first component attenuation value and a corresponding second component attenuation value and to determine the noise value depending on the ratio. An acquired detection value, a first component attenuation value and a second component attenuation value correspond to each other, if they all belong to the same ray path. The determination of the noise value depending on the ratio between a corresponding first component attenuation value and a corresponding second component attenuation value allows to determine high quality noise values in a relatively simple way.

It is preferred that the reconstruction unit is adapted to determine the first component attenuation values and the second component attenuation values by:

determining first component parts and second component parts from the intermediate image, wherein the first component parts show elements of the first component within the region of interest and wherein the second component parts show elements of the second component within the region of interest, determining the first component attenuation values by simulating a forward projection through the first component parts and the second component attenuation values by simulating a forward projection through the second component parts. It is further preferred that the first component parts form a first component image and the second component parts form a second component image, wherein the reconstruction unit is adapted to determine the first component attenuation values by simulating a forward projection through the first component image and the second component attenuation values by simulating a forward projection through the second component image. The intermediate image comprises image elements like voxels or pixels. A single image element can comprise a single component part or a single image element can comprise a first component part and a second component part. If, for example, an image element has an image value of 500 Hounsfield units (HU) and if it is known that a first component corresponding to 0 HU and a second component corresponding to 1000 HU are present in the region of interest, the image element can be regarded as representing 50% of the first component and 50% of the second component.

In an embodiment, the first component parts can be high attenuation parts and the second component parts can be low attenuation parts of the intermediate image, wherein the high attenuation parts show elements within the region of interest having a larger absorption of the radiation and wherein the low attenuation parts show elements within the region of interest having a smaller absorption of the radiation. The high attenuation parts and the low attenuation parts can, for example, be determined by thresholding, wherein image values, which correspond to an absorption of the radiation below the threshold, are regarded as being image values of low attenuation parts and wherein image values, which correspond to an absorption of the radiation being larger than the threshold, are regarded as being image values of high attenuation parts. This allows determining first component attenuation values and second component attenuation values relatively simple by thresholding and forward projecting.

It is also preferred that the detection values providing unit is adapted to provide energy-dependent acquired detection values, wherein the reconstruction unit is adapted to determine the first component attenuation values and the second component attenuation values by applying a base component decomposition method to the energy-dependent acquired detection values. In a preferred embodiment the energy-dependent detection values correspond to a plurality of energy bins, wherein the reconstruction unit is adapted to apply the base component decomposition by solving a system of equations for the plurality of energy-dependent detection values, using a model of the acquired detection values describing an acquired detection value as a combination of a first contribution, which depends on a first energy-dependent attenuation by the first component, and a second contribution, which depends on a second energy-dependent attenuation by the second component.

Elements within the region of interest having a larger absorption of the radiation can be defined for example as having an absorption being larger than a predefined threshold and elements within the region of interest having a smaller absorption of the radiation can be defined as elements having an absorption being smaller than the predefined threshold. For example, the predefined threshold can be defined such that the elements within the region of interest having a smaller absorption correspond to soft tissue, if a part of a person or of an animal is present in the region of interest, and the elements within the region of interest having a larger absorption correspond to, for example, bone, metal or a contrast agent like iodine, which may be present in the region of interest. The first component attenuation values correspond therefore preferentially to, for example, bone elements and the second component attenuation values correspond therefore preferentially to, for example, soft tissue elements.

If more than two kinds of component attenuation values are determined, each kind of component attenuation values corresponds to a component within the region of interest having a specific absorption spectrum for the radiation within a certain absorption range, wherein, in this case, the noise values are preferentially determined depending on the several kinds of component attenuation values, for example, depending on high attenuation detection values, intermediate attenuation detection values and low attenuation detection values, wherein the high attenuation detection values correspond to elements within the region of interest having a larger absorption of the radiation, the intermediate attenuation detection values correspond to elements within the region of interest having an intermediate absorption of the radiation and the low attenuation detection values correspond to elements within the region of interest having a smaller absorption of the radiation. Also the beam hardening correction is, in this case, preferentially performed depending on the several kinds of component attenuation values. This can further improve the quality of the iteratively reconstructed image.

In a further aspect of the present invention an imaging method for imaging a region of interest is presented, wherein the imaging method comprises:

providing acquired detection values of the region of interest, wherein the region of interest comprises at least two components, wherein the detection values have been acquired by moving a radiation source emitting radiation and the region of interest relative to each other and by detecting the detection values, which are indicative of the radiation after having traversed the region of interest, while the radiation source and the region of interest move relative to each other, iteratively reconstructing a final image of the region of interest by performing several iteration steps, in which an intermediate image is updated based on the acquired detection values and based on noise values being indicative of the noise of the detection values, wherein first component attenuation values and second component attenuation values are determined, wherein the first component attenuation values correspond to elements of a first component within the region of interest and wherein the second component attenuation values correspond to elements of a second component within the region of interest, wherein the noise values are determined from the first component attenuation values and the second component attenuation values.

In a further aspect of the present invention an imaging computer program for imaging a region of interest is presented, wherein the imaging computer program comprises program code means for causing an imaging system as defined in claim 1 to carry out the steps of the imaging method as defined in claim 11, when the computer program is run on a computer controlling the imaging system.

It shall be understood that the imaging system of claim 1, the imaging method of claim 11 and the imaging computer program of claim 12 have similar and/or identical preferred embodiments as defined in the dependent claims.

It shall be understood that a preferred embodiment of the invention can also be any combination of the dependent claims with the respective independent claim.

DETAILED DESCRIPTION OF EMBODIMENTS

Figure 1:
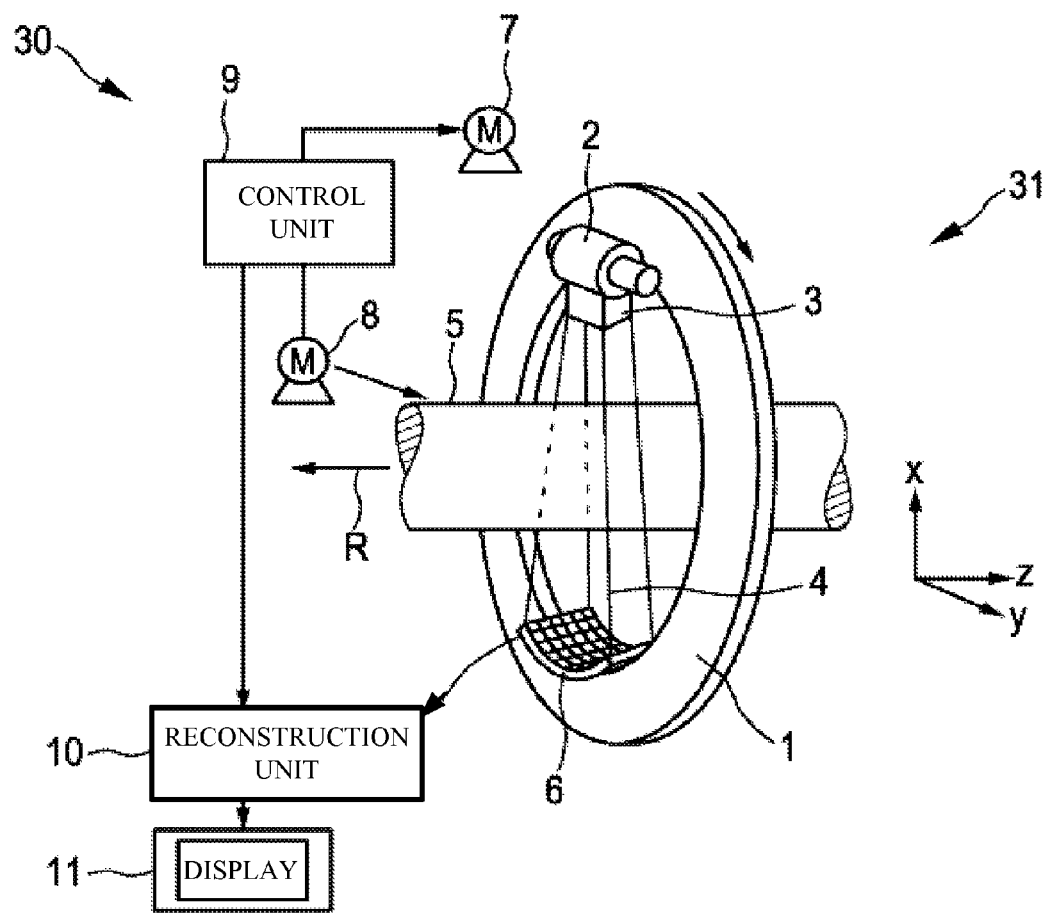
FIG. 1 shows schematically and exemplarily an embodiment of an imaging system for imaging a region of interest.

FIG. 1 shows schematically and exemplarily an imaging system for imaging a region of interest being a computed tomography system 30. The computed tomography system 30 includes a gantry 1 which is capable of rotation about a rotational axis R which extends parallel to the z direction. A radiation source 2, which is, in this embodiment, an x-ray tube, is mounted on the gantry 1. The radiation source 2 is provided with a collimator 3, which forms, in this embodiment, a conical radiation beam 4 from the radiation generated by the radiation source 2. The radiation traverses a region of interest comprising an object or a part of an object. The object is, for example, a person, an animal or a technical object. The region of interest is located within an examination zone 5, which is, in this embodiment, cylindrical. After having traversed the examination zone 5 the radiation beam 4 is incident on a detection device 6, which comprises a two-dimensional detection surface. The detection device 6 is mounted on the gantry 1.

The computed tomography system comprises two motors 7, 8. The gantry 1 is driven at a preferably constant but adjustable angular speed by the motor 7. The motor 8 is provided for displacing the region of interest by displacing the object, for example, a person, who is arranged on a patient table in the examination zone 5, parallel to the direction of the rotational axis R or the z axis. These motors 7, 8 are controlled by a control unit 9, for instance, such that the radiation source 2 and the examination zone 5 and, thus, the region of interest within the examination zone 5, move relatively to each other along a helical trajectory. However, it is also possible that the relative movement is performed along another trajectory. For instance, it is also possible that the object or the examination zone 5 is not moved, but that only the radiation source 2 is rotated, i.e. that the radiation source moves along a circular trajectory relative to the object or the examination zone 5. Furthermore, in another embodiment, the collimator 3 can be adapted for forming another beam shape, in particular a fan beam, and the detection device 6 can comprise a detection surface, which is shaped corresponding to the other beam shape, in particular to the fan beam.

During a relative movement of the radiation source 2 and the examination zone 5 and, thus, the region of interest the detection device 6 generates acquired detection values depending on the radiation incident on the detection surface of the detection device 6. Therefore, the radiation source 2, the elements for moving the radiation source 2 relative to the region of interest, in particular, the motors 7, 8 and the gantry 1, and the detection device 6 form a detection values providing unit 31 for providing acquired detection values of the region of interest.

The acquired detection values are provided to a reconstruction unit 10 for iteratively reconstructing a final image of the region of interest. Also the reconstruction unit 10 is preferentially controlled by the control unit 9. The reconstruction unit 10 is adapted to iteratively reconstruct a final image of the region of interest, which comprises at least two components of the object, by performing several iteration steps, in which an intermediate image is updated based on the acquired detection values and based on noise values being indicative of the noise of the acquired detection values. The noise values are determined from first component attenuation values and second component attenuation values, which are also determined by the reconstruction unit 10. The first component attenuation values correspond to elements of a first component within the region of interest and the second component attenuation values correspond to elements of a second component within the region of interest. In this embodiment, the first component attenuation values are high attenuation detection values, which correspond to elements within the region of interest having a larger absorption of the radiation 4, and the second component attenuation values correspond to low attenuation detection values, which correspond to elements within the region of interest having a smaller absorption. Moreover, in this embodiment, the noise values are variances of the acquired detection values, and the reconstruction unit 10 is adapted to correct the acquired detection values for beam hardening based on the determined first component attenuation values and the determined second component attenuation values. The reconstruction unit 10 is preferentially further adapted to determine the noise values not only depending on the first component attenuation values and the second component attenuation values, but also depending on the energy spectrum of the radiation 4 emitted by the radiation source 2.

In this embodiment, the reconstruction unit 10 is adapted to perform in an iteration step a forward projection through the intermediate image for generating simulated line integrals of absorption values, a subtraction of a line integral of absorption values determined from the respective acquired detection value and the simulated line integral of absorption values, a calculation of an update from the difference values by using the noise values and a back projection of the update for updating the intermediate image, wherein several of these iteration steps are performed, until a termination condition is fulfilled, in particular, until the deviations between the simulated line integrals of absorption values and the line integrals of absorption values determined from the acquired detection values or deviations between an actual intermediate image and a previous intermediate image are below a predefined threshold. Initially, the intermediate image can be, for example, an image having zero values as image values. The reconstruction unit 10 is preferably further adapted to perform in at least one of the iteration steps a beam hardening correction for correcting the acquired detection values, wherein the corrected acquired detection values are used in the respective iteration step and also in the following iteration steps for updating the intermediate image.

The reconstruction unit 10 is preferably adapted to determine the first component attenuation values and the second component attenuation values by: i) determining high attenuation parts and low attenuation parts from the intermediate image, wherein the high attenuation parts show elements within the region of interest having a larger absorption of the radiation and wherein the low attenuation parts show elements within the region of interest having a smaller absorption of the radiation; and ii) determining the first component attenuation values by simulating a forward projection through the high attenuation parts and the second component attenuation values by simulating a forward projection through the low attenuation parts. In this embodiment, elements within the region of interest having a larger absorption of the radiation 4 are defined as having an absorption being larger than a predefined threshold and elements within the region of interest having a smaller absorption of the radiation 4 can be defined as elements having an absorption being smaller than the predefined threshold. In this example, the threshold is chosen such that elements within the region of interest having an absorption being larger than the threshold represent bone, metal and/or a contrast agent, which may be present in the region of interest, and elements within the region of interest having an absorption being smaller than the threshold represent soft tissue. In particular, by thresholding high attenuation parts forming a high attenuation image and low attenuation parts forming a low attenuation image are determined, wherein the high attenuation image shows bone, metal and/or a contrast agent, if present within the region of interest, and the low attenuation image shows soft tissue. The first component attenuation values can then be determined by simulating a forward projection through the high attenuation image and the second component attenuation values can be determined by simulating a forward projection through the low attenuation image. The first component attenuation values correspond therefore preferentially to, for example, bone, metal and/or contrast agent elements and the second component attenuation values correspond therefore preferentially to, for example, soft tissue elements.

The reconstruction unit 10 can also be adapted to determine first component attenuation values and second component attenuation values in another way, in particular, if the detection values providing unit 31 is adapted to provide energy-dependent acquired detection values. For providing energy-dependent detection values the radiation source of the detection values providing unit is preferentially a polychromatic radiation source and the detection device of the detection values providing unit is preferentially an energy-resolving detection device.

An energy resolving detection device works, for example, on the principle of counting the incident photons and outputting a signal that shows the number of photons per energy in a certain energy bin. Such an energy-resolving detection device is described in, for instance, the articles "First test measurements of a 64 k pixel readout chip wordkin in a single photon counting mode" by Llopart, X., et al., Nuclear Instruments and Methods in Physics Research, Section A, Volume 509, Issue 1-3, pages 157-163 (2003), and "Medipix 2: A 64-k pixel readout chip with 55 mum square elements working in a single photon counting mode" by Llopart, X., et al., IEEE Transactions on Nuclear Science, Volume 49, Issue 5, pages 2279-2283 (2000), which are herewith incorporated by reference.

The reconstruction unit 10 can be adapted to determine the first component attenuation values and the second component attenuation values by applying a base component decomposition method, which is, in this embodiment, a base material decomposition method to the energy-dependent acquired detection values, wherein a first base material like bone, metal or a contrast agent, comprises a larger absorption of the radiation and wherein a second base material like soft tissue comprises a smaller absorption of the radiation. For instance, the energy-dependent detection values can correspond to a plurality of energy bins, wherein the reconstruction unit 10 can be adapted to apply the base material decomposition by solving a system of equations for the plurality of energy-dependent detection values, using a model of the detection values describing a detection value as a combination of a first contribution, which depends on a first energy-dependent attenuation by the first base material, and a second contribution, which depends on a second energy-dependent attenuation by the second base material. In particular, the reconstruction unit 10 can be adapted to solve following system of equations:

$$S_i = \int dE \phi(E) \delta_i(E) \exp(-\Sigma_{j=1}^{N} A_j f_j(E)), \quad (1)$$

wherein $S_i$ denotes a detection value of the i-th energy bin, $\phi(E)$ denotes the spectrum of radiation immediately before traversing the object to be imaged, $\delta_i(E)$ denotes the spectral sensitivity of the i-th energy bin, N denotes the number of base materials, for example, two for bone and soft tissue, $A_j$ denotes the linear attenuation of material j, and $f_j(E)$ denotes the energy dependent absorption of material j.

If the number of energy bins is at least equal to the number of base materials, the system of equations can be solved with known numerical methods, wherein the quantities $\phi(E)$, $\delta_i(E)$ and $f_j(E)$ are known and the result of solving the system of equations are the linear attenuations $A_j$. The spectrum of radiation $\phi(E)$ and the spectral sensitivity $\delta_i(E)$ are characteristics of the imaging system and are known from, for example, corresponding measurements. The spectral absorption $f_j(E)$ of the modeled materials like bone and soft tissue are also known from measurements and/or are known from literature. If, for example, the number of base materials is two, wherein a first base material being, for example, bone has a larger absorption than a second base material being, for example, soft tissue, the linear attenuation $A_1$ represents the determined first component attenuation values and the linear attenuation $A_2$ represents the determined second component attenuation values.

Although in the above described embodiments preferentially two kinds of detection values are determined, i.e. first component attenuation values and second component attenuation values, the reconstruction unit 10 can also be adapted to determine more than two kinds or two classes of detection values. For example, several different classes of detection values can be determined, wherein each class corresponds to elements within the region of interest having a specific absorption spectrum for the radiation 4 within a certain absorption range. For example, first component attenuation values, second component attenuation values, and third component attenuation values, or more than three different kinds of detection values can be determined. In particular, by using equation (1) N kinds of detection values can be determined, wherein each of these kinds of detection values corresponds to a certain base material. For instance, detection values can be determined for soft tissue, bones, metal, a contrast agent like iodine or other materials.

The reconstruction unit 10 comprises preferentially an assignment between a) a first component attenuation value, a second component attenuation value, the energy spectrum of the radiation emitted by the radiation source, and b) a variance of the corresponding acquired detection value. This assignment is, for example, stored as a table or as a function in the reconstruction unit 10. By using the assignment to each acquired detection value a variance can be assigned. The assignment can be generated by, for example, calibration measurements, wherein for different known spectra of the emitted radiation and different known ratios of the first component and the second component within the ray, which has caused a respective acquired detection value, the variance is measured. It is also possible to determine the assignment by simulating measurements or by calculating the assignment using, for example, a Poisson noise model. Preferentially, the assignment assigns a variance of the respective acquired detection value depending on a ratio of the corresponding first and second component attenuation values and preferentially the tube current and tube voltage of the radiation source, if the radiation source is an x-ray tube, wherein it is assumed that the spectrum of the radiation emitted by the x-ray tube is defined by the tube current and the tube voltage.

The reconstruction unit 10 comprises preferentially further a beam hardening correction function for non-linearly mapping the acquired detection values to corrected acquired detection values by applying the beam hardening correction function to the acquired detection values. The beam hardening correction function is preferentially a polynomial. The coefficients of the polynomial are preferentially determined by calibration measurements or calibration simulations, wherein for different spectra of radiation emitted by the radiation source and different distributions of the different components within the region of interest detection values are measured or simulated and used for reconstructing an image of the region of interest showing beam hardening artifacts and wherein the coefficients of the polynomial are adjusted such that the beam hardening artifacts are reduced in the reconstructed image, in particular, such that the beam hardening artifacts are eliminated in the reconstructed image. For different spectra of the radiation emitted by the radiation source and different first and second component attenuation values, which correspond to a respective measured or simulated detection value, different beam hardening correction functions can therefore be determined such that for an acquired detection value a beam hardening correction function can be used, which is assigned to the corresponding first and second component attenuation values, in particular, the ratio of these corresponding component attenuation values, and to the spectrum of the radiation emitted by the radiation source. Since, as already mentioned above, if the radiation source is an x-ray tube, the spectrum of the radiation emitted by the radiation source can be defined by the tube current and the tube voltage, the beam hardening correction function can be provided depending on the corresponding first and second component attenuation values and the tube current and tube voltage.

The reconstruction unit 10 is adapted to correct the acquired detection values for beam hardening by using the beam hardening correction function and to use the corrected acquired detection values together with the determined variance of the detection values for iteratively reconstructing an image of the region of interest, in particular, in accordance with following iteration equation:

$$\mu_m^{n+1} = \mu_m^n + \frac{\sum_k a_{km} \frac{1}{\sigma_k^2} \left(-\log \frac{y_k}{b_k} - 1_k^n\right)}{\sum_k a_{km} \frac{1}{\sigma_k^2} a_k}, \quad (2)$$

wherein $y_k$ is the corrected detection value, i.e. the corrected measured intensity value, in the i-th measurement, $b_k$ denotes a corrected detection value, i.e. a corrected intensity value, which is measured, when the object is not present in the examination zone of the imaging system, $\mu_m^n$ denotes the image values of the intermediate image in the n-th iteration, $a_{km}$ denotes the intersection of the image element denoted by m with the ray belonging to the measurement k, $\sigma_k^2$ denotes the variance of the respective acquired detection value, $1_k^n$ denotes the simulated forward projected line integrals of absorption values, which corresponds to the corrected acquired detection value $y_k$ in the n-th iteration, and $a_i$ denotes a simulated line integral of absorption values, which has been simulated by performing a forward projection through a unity image along the ray which corresponds to the i-th measurement.

The iteration in accordance with equation (2) is performed until a termination condition is fulfilled, in particular, until deviations between an actual intermediate image and a previous intermediate image are below a predefined threshold.

Referring again to FIG. 1, the iteratively reconstructed image is preferentially provided to a display unit 11 for displaying the image.

Figure 2:
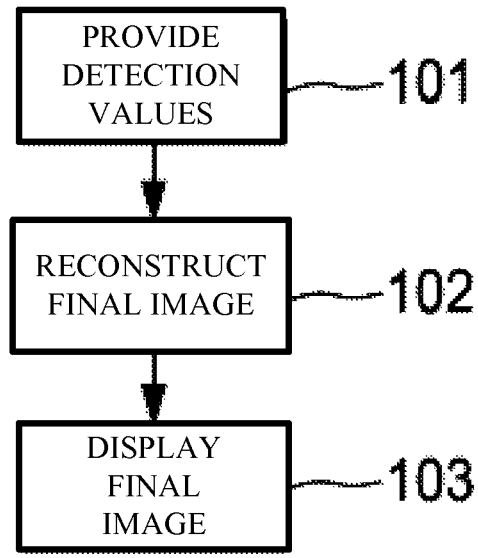
FIG. 2 shows a flowchart exemplarily illustrating an embodiment of an imaging method for imaging a region of interest.

In the following an embodiment of an imaging method for imaging a region of interest will exemplarily be described with reference to a flowchart shown in FIG. 2.

In step 101, acquired detection values of the region of interest are provided, wherein the region of interest comprises at least two components, wherein the detection values have been acquired by moving the radiation source 2 emitting radiation 4 and the region of interest relative to each other and by detecting the detection values, which are indicative of the radiation after having traversed the region of interest, while the radiation source and the region of interest move relative to each other. In step 102, a final image of the region of interest is iteratively reconstructed by performing several iteration steps, in which an intermediate image is updated based on the acquired detection values, and based on noise values being indicative of the noise of the detection values, and, in step 103, the final image is shown on the display unit 11.

Figure 3:
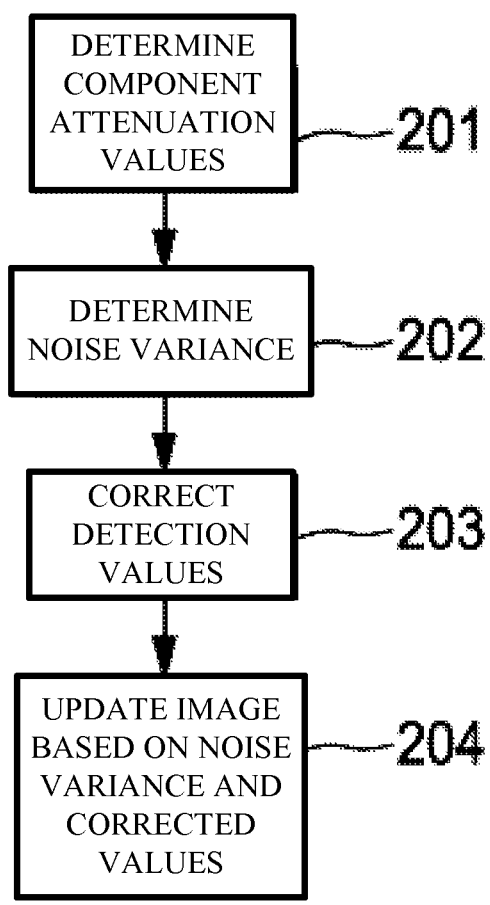
FIG. 3 shows a flowchart exemplarily illustrating several steps of an iteration step.

Steps performed during an iteration step will in the following exemplarily be described with reference to a flowchart shown in FIG. 3.

In step 201, first component attenuation values and second component attenuation values are determined, wherein the first component attenuation values correspond to elements of a first component within the region of interest and wherein the second component attenuation values correspond to elements of a second component within the region of interest. In step 202, for each acquired detection value a noise variance is determined depending on the corresponding first component attenuation value, the corresponding second component attenuation value and optionally depending on the spectrum of the radiation emitted by the radiation source. In step 203, the acquired detection values are beam hardening corrected, and, in step 204, the corrected acquired detection values and the determined noise variance are used for updating the intermediate image, which may initially be, for example, a zero image. The updating of the intermediate image can be performed by forward projecting through the intermediate image for generating simulated line integrals of absorption values, determining differences between a line integral of absorption values determined from the respective acquired corrected detection value and the simulated line integral of absorption values, calculating an update based on the differences and the noise variance, and back projecting the updates, in particular, in accordance with equation (2). In an iteration step, the forward projection and the back projection are preferentially performed for each radiation source position, for which the detection values have been acquired, while the radiation source was moved with respect to the region of interest, in order to perform the forward projection and the back projection in different angular directions. In another embodiment, also another known updating algorithm can be used for updating the intermediate image.

The correction of the acquired detection values can be performed in one, several or all iteration steps, or before the iteration is started. If the beam hardening correction of the acquired detection values is not performed in all iteration steps, for iteration steps, in which the correction is not performed, the above described step 203 is omitted. Also the determination of the noise variance can be performed before the iteration starts, or in one, several, or all iteration steps. In an iteration step, in which the noise variance is not determined, step 202 is omitted.

If the radiation source emits polychromatic x-rays, the low energy part of the x-rays are stronger absorbed than the high energy part. This effect, referred as beam hardening, has consequences for imaging. In "harder" beams, the absorption of tissue is lower. This non-linearity of absorption causes so-called beam hardening artifacts in computed tomography images. Known iterative reconstruction techniques suffer from this effect and additionally from the induced inconsistency of the acquired detection values and its impact on the noise characteristic. Ignoring noise contributions from the detection device itself, the noise of a computed tomography measurement is originated from a Poisson distributed noise of the statistics of incoming photons. The detection device can perform an energy weighting, which means that the output signal is proportional to $$\int dE\ E N(E) \qquad (3)$$

wherein $N(E)$ is the number of photons with energy E. This detector characteristic changes the distribution of the noise to so-called compound Poisson noise and makes the noise energy dependent. The resulting consequence is that beam hardening impacts the noise characteristics of the acquired detection values. By using the above described imaging system and imaging method for imaging a region of interest these effects of beam hardening can be reduced, in particular eliminated.

The imaging system and the imaging method incorporates preferentially a beam hardening model into the iterative reconstruction, in order to correct for beam hardening and to improve the associated noise model. Within the iterative reconstruction algorithm a correction step can be applied once or multiple times. The correction step may comprise: i) estimating a soft tissue image and a bone image from an intermediate image; ii) performing a forward projection of these images; iii) using the approximated soft tissue and bone absorption to estimate the beam hardening and a related correction for the measured data, i.e. for the acquired detection values, and applies this correction to the data for further iterations; and iv) estimating an improved noise model with the approximated soft tissue and bone projections.

The imaging system and imaging method can be applied to dual or multi energy computed tomography scanning, wherein additional images such as contrast material maps can be used to improve the estimation of the beam hardening effect and to improve the resulting correction. The correction can be extended to iodine or other materials separated by dual or multi energy computed tomography techniques. The calculation of the attenuation correction and the improved noise model can be based on theoretical models or on calibration methods in which special phantoms are scanned to derive parameterized correction functions. In particular, the above mentioned formula can be used for predicting the beam hardening effect, based on the linear attenuation $A_j$ of the base materials. The correction can be based on calibration using phantoms of, for example, bone and soft tissue, with various thicknesses. If different combinations of these phantoms are scanned, the parameter of a simple non-linear beam hardening model, in particular of a polynomial beam hardening model, can be estimated and used for the correction. Similar to the beam hardening correction, the impact on the noise can be estimated with the theoretical methods or it can be based on calibration measurements.

Although in the above described embodiments the imaging system is a computed tomography system, the imaging system can also be another imaging system, which uses detection values for iteratively reconstructing an image of a region of interest. For example, the imaging system can be an x-ray C-arm imaging system or a nuclear imaging system like a single photon emission computed tomography system or a positron emission tomography system.

Although in the above described embodiments the different components are, for example, high attenuation components and low attenuation components, which are related to different base materials like bone and soft tissue, the different components can also relate to different physical effects like a photoelectric effect, a Compton effect, a K-edge effect, et cetera.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations, corrections, calculations, et cetera performed by one or several units or devices can be performed by any other number of units or devices. For example, steps 102 and 201 to 204 can be performed by a single unit or by any other number of different units. The determinations, corrections and calculations, and/or the control of the imaging system in accordance with the imaging method can be implemented as program code means of a computer program and/or a dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The noise of a detection value acquired by an imaging system can depend on the contributions of different components within a region of interest to be imaged, which has been traversed by radiation causing the respective acquired detection value. This dependence is considered while iteratively reconstructing an image of the region of interest, wherein first component attenuation values, which correspond to elements of a first component within the region of interest, and second component attenuation values, which correspond to elements of a first component within the region of interest, are determined, wherein noise values are determined from the first component attenuation values and the second component attenuation values and wherein the noise values are used for updating the image. This consideration of the dependence of the noise of an acquired detection value on the different components improves the quality of the iteratively reconstructed image.

The invention claimed is:

1. An imaging system for imaging a region of interest, the imaging system comprising:
    a detection device that provides acquired detection values of the region of interest, wherein the region of interest comprises at least two components, wherein the detection values have been acquired by moving a radiation source emitting radiation and the region of interest relative to each other and by detecting the detection values, which are indicative of the radiation after having traversed the region of interest, while the radiation source and the region of interest move relative to each other,
    a reconstructor that iteratively reconstructs a final image of the region of interest by performing several iteration steps, in which an intermediate image is updated based on the acquired detection values and based on noise values being indicative of the noise of the detection values, wherein the reconstructor further:
    determines first component attenuation values and second component attenuation values, wherein the first component attenuation values correspond to elements of a first component within the region of interest and wherein the second component attenuation values correspond to elements of a second component within the region of interest,
    determines the noise values from the first component attenuation values and the second component attenuation values, wherein the reconstructor determines for each acquired detection value a ratio between a corresponding first component attenuation value and a corresponding second component attenuation value and determines the noise value depending on the ratio.

2. The imaging system as defined in claim 1, wherein the reconstructor further corrects the acquired detection values for beam hardening based on the determined first component attenuation values and the determined second component attenuation values.

3. The imaging system as defined in claim 1, wherein the noise values are variances of the detection values.

4. The imaging system as defined in claim 1, wherein the noise values are determined depending on the energy spectrum of the radiation emitted by the radiation source.

5. The imaging system as defined in claim 1, wherein the reconstructor further determines for each acquired detection value a ratio between a corresponding first component attenuation value and a corresponding second component attenuation value and to determine the noise value depending on the ratio.

6. The imaging system as defined in claim 1, wherein the reconstructor further determines the first component attenuation values and the second component attenuation values by:
    determining first component parts and second component parts from the intermediate image, wherein the first component parts show elements of the first component within the region of interest and wherein the second component parts show elements of the second component within the region of interest,
    determining the first component attenuation values by simulating a forward projection through the first component parts and the second component attenuation values by simulating a forward projection through the second component parts.

7. The imaging system as defined in claim 6, wherein the first component parts form a first component image and the second component parts form a second component image and wherein the reconstructor further determines the first component attenuation values by simulating a forward projection through the first component image and the second component attenuation values by simulating a forward projection through the second component image.

8. The imaging system as defined in claim 1, wherein the detection device further provides energy-dependent acquired detection values and wherein the reconstruction unit is adapted to determine the first component attenuation values and the second component attenuation values by applying a base component decomposition method to the energy-dependent acquired detection values.

9. The imaging system as defined in claim 8, wherein the energy-dependent detection values correspond to a plurality of energy bins and wherein the reconstructor further applies the base component decomposition by solving a system of equations for the plurality of energy-dependent detection values, using a model of the acquired detection values describing an acquired detection value as a combination of a first contribution, which depends on a first energy-dependent attenuation by the first component, and a second contribution, which depends on a second energy-dependent attenuation by the second component.

10. The imaging system as defined in claim 1, wherein the first component attenuation values correspond to bone elements and the second component attenuation values correspond to soft tissue elements.

11. An imaging method for imaging a region of interest, the imaging method comprising:
    providing acquired detection values of the region of interest, wherein the region of interest comprises at least two components, wherein the detection values have been acquired by moving a radiation source emitting radiation and the region of interest relative to each other and by detecting the detection values, which are indicative of the radiation after having traversed the region of interest, while the radiation source and the region of interest move relative to each other,
    iteratively reconstructing a final image of the region of interest by performing several iteration steps, in which an intermediate image is updated based on the acquired detection values and based on noise values being indicative of the noise of the detection values, wherein first component attenuation values and second component attenuation values are determined, wherein the first component attenuation values correspond to elements of a first component within the region of interest, wherein the second component attenuation values correspond to elements of a second component within the region of interest, wherein the noise values are determined from the first component attenuation values and the second component attenuation values, and wherein for each acquired detection value a ratio between a corresponding first component attenuation value and a corresponding second component attenuation value and the noise value is determined depending on the ratio.

12. A non-transitory computer readable medium with an imaging computer program stored therein, wherein the imaging computer program, when executed by a computer processor, causes the computer processor to:

provide acquired detection values of the region of interest, wherein the region of interest comprises at least two components, wherein the detection values have been acquired by moving a radiation source emitting radiation and the region of interest relative to each other and by detecting the detection values, which are indicative of the radiation after having traversed the region of interest, while the radiation source and the region of interest move relative to each other; and iteratively reconstruct a final image of the region of interest by performing several iteration steps, in which an intermediate image is updated based on the acquired detection values and based on noise values being indicative of the noise of the detection values, wherein first component attenuation values and second component attenuation values are determined, wherein the first component attenuation values correspond to elements of a first component within the region of interest wherein the second component attenuation values correspond to elements of a second component within the region of interest, wherein the noise values are determined from the first component attenuation values and the second component attenuation values, and wherein for each acquired detection value a ratio between a corresponding first component attenuation value and a corresponding second component attenuation value and the noise value is determined depending on the ratio.

13. The imaging method as defined in claim 11, further comprising: correcting the acquired detection values for beam hardening based on the determined first component attenuation values and the determined second component attenuation values.

14. The imaging method as defined in claim 11, wherein the noise values are variances of the detection values.

15. The imaging method as defined in claim 11, further comprising: determining the noise values depending on the energy spectrum of the radiation emitted by the radiation source.

16. The imaging method as defined in claim 11, further comprising: determining the first component attenuation values and the second component attenuation values by:

determining first component parts and second component parts from the intermediate image, wherein the first component parts show elements of the first component within the region of interest and wherein the second component parts show elements of the second component within the region of interest, determining the first component attenuation values by simulating a forward projection through the first component parts and the second component attenuation values by simulating a forward projection through the second component parts.

17. The imaging method as defined in claim 16, wherein the first component parts form a first component image and the second component parts form a second component image and further comprising: determining the first component attenuation values by simulating a forward projection through the first component image and the second component attenuation values by simulating a forward projection through the second component image.

18. The imaging method as defined in claim 11, further comprising: providing energy-dependent acquired detection values and determining the first component attenuation values and the second component attenuation values by applying a base component decomposition method to the energy-dependent acquired detection values.

19. The imaging method as defined in claim 18, wherein the energy-dependent detection values correspond to a plurality of energy bins and further comprising: applying the base component decomposition by solving a system of equations for the plurality of energy-dependent detection values, using a model of the acquired detection values describing an acquired detection value as a combination of a first contribution, which depends on a first energy-dependent attenuation by the first component, and a second contribution, which depends on a second energy-dependent attenuation by the second component.

20. The imaging method as defined in claim 11, wherein the first component attenuation values correspond to bone elements and the second component attenuation values correspond to soft tissue elements.

* * * * *